US012703895B2

(12) United States Patent
Peel et al.

(10) Patent No.: US 12,703,895 B2
(45) Date of Patent: Aug. 11, 2026

(54) PROCESSING METHODS AND PROCESSING APPARATUS

(71) Applicant: Altek Europe Ltd., Chesterfield (GB)

(72) Inventors: Alan Peel, Chesterfield (GB); Andrew Gibbs, Chesterfield (GB)

(73) Assignee: Altek Europe Limited, Chesterfield (GB)

( * ) Notice: Subject to any disclaimer, the term of this patent is extended or adjusted under 35 U.S.C. 154(b) by 1002 days.

(21) Appl. No.: 16/462,040

(22) PCT Filed: Nov. 27, 2017

(86) PCT No.: PCT/GB2017/053551
§ 371 (c)(1),
(2) Date: May 17, 2019

(87) PCT Pub. No.: WO2018/096358
PCT Pub. Date: May 31, 2018

(65) Prior Publication Data

US 2019/0300983 A1 Oct. 3, 2019

(30) Foreign Application Priority Data

Nov. 27, 2016 (GB) ..................................... 1620032

(51) Int. Cl.
*C22B 21/00* (2006.01)
*C22B 7/04* (2006.01)

(52) U.S. Cl.
CPC ............ *C22B 21/0069* (2013.01); *C22B 7/04* (2013.01); *C22B 21/0007* (2013.01); *Y02P 10/20* (2015.11)

(58) Field of Classification Search
CPC ... C22B 21/0007; C22B 21/0069; C22B 7/04; Y02P 10/20; Y02P 10/212
(Continued)

(56) References Cited

U.S. PATENT DOCUMENTS 3,064,806 A * 11/1962 Hukki ........................ B03B 5/40
209/268
4,126,673 A 11/1978 Cromwell
(Continued)

FOREIGN PATENT DOCUMENTS

EP 0576254 A2 12/1993
JP 2000503901 A * 4/2000
WO 2015056033 A1 4/2015

OTHER PUBLICATIONS

NPL: on-line translation of JP-2000503901A, Apr. 2000 (Year: 2000).*
(Continued)

*Primary Examiner* — Jie Yang
(74) *Attorney, Agent, or Firm* — Norton Rose Fulbright US LLP

(57) ABSTRACT

Methods and apparatus for processing a material, the material being the upper layer from a metal melting process, the material containing one or more salts, the material containing one or metals, are provided. The method includes feeding the material to a size reduction step; feeding the material from the size reduction step to a density based separation step; feeding the material from the density based separation step to a leaching step. The size reduction stage is optimised to provide exposure of material for a ferrous and non-ferrous metal separation. The ferrous separation is preferably provided by an eddy current separator. The non-ferrous separation is preferably provided by a cyclone.

14 Claims, 3 Drawing Sheets

(58) Field of Classification Search
USPC .......................................................... 75/672
See application file for complete search history.

(56) References Cited

U.S. PATENT DOCUMENTS

| | | | | |
|---|---|---|---|---|
| 4,292,281 | A * | 9/1981 | Chilcote | C22B 15/008 423/604 |
| 5,993,512 | A * | 11/1999 | Pargeter | C22B 21/0069 75/416 |
| 6,199,779 | B1 | 3/2001 | Mosher | |
| 10,577,675 | B2 * | 3/2020 | Peel | C22B 7/006 |
| 2015/0367311 | A1 * | 12/2015 | Spence | B01J 19/2465 422/224 |
| 2016/0265083 | A1 * | 9/2016 | Peel | C22B 21/0015 |

OTHER PUBLICATIONS

International Search Report and Written Opinion from counterpart International Patent Application No. PCT/GB2017/053551 mailed Mar. 29, 2019, 8 pages.

Tsakiridis, P.E., "Aluminium salt slag characterization and utilization—A review", Journal of Hazardous Materials, Mar. 16, 2012, vol. 217, pp. 1-10.

* cited by examiner

PROCESSING METHODS AND PROCESSING APPARATUS

This invention concerns improvements in and relating to processing methods and apparatus, particularly for processing slags to recover one or more useful components thereof.

Furnaces handling molten aluminium, for example, are provided with a salt barrier on top of the molten metal to reduce oxidisation and/or promote the removal of contaminants from the molten metal. The salt barrier effectively becomes part of the slag as a result of the process, after which it is commonly referred to as a salt slag. There are advantages in processing this material once removed from the furnace. The advantages include the recovery and reuse of one or more of the components and/or a reduction in the hazards the slag presents.

Existing approaches tend to use centralised processing plants to take the cold slag and reprocess it. This causes transport issues in terms of cost and transport footprint and has a negative impact upon the subsequent processing and products.

The invention has amongst its possible aims to facilitate processing of the slags, economically at the same site it is produced at. The invention has amongst its possible aims to reduce costs involved in the processing. The invention has amongst its potential aims to give improved products, potentially in terms of their value and/or usefulness.

According to a first aspect there is provided a method of processing a material, the method including:

a) feeding the material to a leaching step;
b) obtaining a leachate from the leaching step;
c) feeding the leachate to a drying step or spray drying step;
d) obtaining a solid from the drying step or spray drying step.

The method may include the further step of compressing and/or moulding the solid into pellets.

The method may include 1) providing a material on the surface of a molten metal in a furnace, the furnace being at a first location; 2) removing the material from the furnace; 3) processing the material removed from the furnace at a second location, the second location being 5 km or less from the first location and the processing including one or more of steps a), b), c) or d). The method may include one or more of the processes at the second location being applied before the temperature of the material removed from the furnace has reduced below 100° C., preferably below 350° C., more preferably below 525° C. and yet more preferably below 760° C.

According to a second aspect there is provided apparatus for processing a material, the apparatus including:

a) leaching apparatus;
b) a feeder providing material to the leaching apparatus;
c) an outlet for leachate from the leaching apparatus;
d) a dryer or spray dryer;
e) the outlet being fluidly connected to the spay dryer;
f) an outlet from the dryer or spray dryer for solids.

The apparatus may include the compression and/or moulding apparatus for producing pellets and/or a feeder for providing a solid obtained from the leachate to the compression and/or moulding apparatus.

The apparatus may include 1) a furnace, the furnace being at a first location; 2) a feeder for introducing a material to the surface of a molten metal in the furnace; 3) one or more processors for the material removed from the furnace, the one or more processors being provided at a second location, the second location being 5 km or less from the first location and the one or more processors including one or more of the processors in one or more of features a), b), c), d), e) or f).

According to a third aspect there is provided a method of processing a material, the method including a) feeding the material to a leaching step;
b) obtaining a leachate from the leaching step;
c) obtaining a solid from the leachate;
d) compressing and/or moulding the solid into pellets.

The method may include feeding the leachate to a drying step or spray drying step, preferably to obtain the solid for the compressing and/or moulding step.

The method may include 1) providing a material on the surface of a molten metal in a furnace, the furnace being at a first location; 2) removing the material from the furnace; 3) processing the material removed from the furnace at a second location, the second location being 5 km or less from the first location and the processing including one or more of steps a), b), c) or d). The method may include one or more of the processes at the second location being applied before the temperature of the material removed from the furnace has reduced below 100° C., preferably below 350° C., more preferably below 525° C. and yet more preferably below 760° C.

According to a fourth aspect there is provided apparatus for processing a material, the apparatus including:

a) leaching apparatus;
b) a feeder providing material to the leaching apparatus;
c) an outlet for leachate from the leaching apparatus;
d) compression and/or moulding apparatus for producing pellets;
e) a feeder for providing a solid obtained from the leachate to the compression and/or moulding apparatus.

The apparatus may include a dryer or spray dryer and/or the outlet being fluidly connected to the dryer or spray dryer and/or an outlet from the dryer or spray dryer for solids.

The apparatus may include 1) a furnace, the furnace being at a first location; 2) a feeder for introducing a material to the surface of a molten metal in the furnace; 3) one or more processors for the material removed from the furnace, the one or more processors being provided at a second location, the second location being 5 km or less from the first location and the one or more processors including one or more of the processors in one or more of features a), b), c), d) or e).

According to a fifth aspect there is provided a method of processing a material, the method including a) providing a material on the surface of a molten metal in a furnace, the furnace being at a first location;
b) removing the material from the furnace;
c) processing the material removed from the furnace at a second location, the second location being 5 km or less from the first location and the processing including one or more steps selected from:
   1) reduction of the size of a mass of the material;
   2) leaching the material to provide a leachate;
   3) drying or spray drying one or more components, such as a leachate, to provide a solid;
   4) compressing or moulding a solid, for instance the solid obtained from a leachate, to provide pellets.

The method may include one or more of the processes at the second location being applied before the temperature of the material removed from the furnace has reduced below 100° C., preferably below 350° C., more preferably below 525° C. and yet more preferably below 760° C.

The method may include feeding the leachate to a drying step or spray drying step, preferably to obtain the solid for the compressing and/or moulding step.

The method may include the further step of compressing and/or moulding the solid into pellets.

According to a sixth aspect there is provided apparatus for processing a material, the apparatus including a) a furnace, the furnace being at a first location;

b) a feeder for introducing a material to the surface of a molten metal in the furnace;

c) one or more processors for the material removed from the furnace, the one or more processors being provided at a second location, the second location being 5 km or less from the first location and the one or more processors including one or more processors selected from:

1) a breaker for reducing of the size of a mass of the material;

2) leaching apparatus;

3) drying or spray drying step apparatus;

4) compression or moulding apparatus for a solid, for instance the solid obtained from a leachate from the leaching apparatus, to provide pellets.

According to a seventh aspect there is provided a method of processing a material, the method including:

a) feeding the material to a leaching step;

b) obtaining material from the leaching step;

c) feeding the material from the leaching step to a filtration step;

d) feeding the solid material from the filtration step to drying step.

The method may include the further step of compressing and/or moulding the solid into pellets.

The method may include 1) providing a material on the surface of a molten metal in a furnace, the furnace being at a first location; 2) removing the material from the furnace; 3) processing the material removed from the furnace at a second location, the second location being 5 km or less from the first location and the processing including one or more of steps a), b), c) or d). The method may include one or more of the processes at the second location being applied before the temperature of the material removed from the furnace has reduced below 100° C., preferably below 350° C., more preferably below 525° C. and yet more preferably below 760° C.

According to an eighth aspect there is provided apparatus for processing a material, the apparatus including:

a) a feeder providing material to the leaching apparatus;

b) leaching apparatus;

c) an outlet for material from the leaching apparatus to filtration apparatus;

d) filtration apparatus;

e) a feeder from the filtration apparatus to a dryer;

f) a dryer.

The apparatus may include the compression and/or moulding apparatus for producing pellets and/or a feeder for providing a solid obtained from the leachate to the compression and/or moulding apparatus.

The apparatus may include 1) a furnace, the furnace being at a first location; 2) a feeder for introducing a material to the surface of a molten metal in the furnace; 3) one or more processors for the material removed from the furnace, the one or more processors being provided at a second location, the second location being 5 km or less from the first location and the one or more processors including one or more of the processors in one or more of features a), b), c), d), e) or f).

According to a ninth aspect there is provided a method of processing a material, the method including:

a) feeding the material to a size reduction step;

b) feeding the material from the size reduction step to a density based separation step;

c) feeding the material from the density based separation step to a leaching step.

The method may include the further step of compressing and/or moulding the solid into pellets.

The method may include 1) providing a material on the surface of a molten metal in a furnace, the furnace being at a first location; 2) removing the material from the furnace; 3) processing the material removed from the furnace at a second location, the second location being 5 km or less from the first location and the processing including one or more of steps a), b), c) or d). The method may include one or more of the processes at the second location being applied before the temperature of the material removed from the furnace has reduced below 100° C., preferably below 350° C., more preferably below 525° C. and yet more preferably below 760° C.

According to an tenth aspect there is provided apparatus for processing a material, the apparatus including:

a) a feeder providing material to size reduction apparatus;

b) size reduction apparatus;

c) a feeder providing material to density based separation apparatus;

d) density based separation apparatus;

e) a feeder providing material to leaching apparatus;

f) leaching apparatus.

The apparatus may include the compression and/or moulding apparatus for producing pellets and/or a feeder for providing a solid obtained from the leachate to the compression and/or moulding apparatus.

The apparatus may include 1) a furnace, the furnace being at a first location; 2) a feeder for introducing a material to the surface of a molten metal in the furnace; 3) one or more processors for the material removed from the furnace, the one or more processors being provided at a second location, the second location being 5 km or less from the first location and the one or more processors including one or more of the processors in one or more of features a), b), c), d), e) or f).

The first and/or second and/or third and/or fourth and/or fifth and/or sixth and/or seventh and/or eighth and/or ninth and/or tenth aspects of the invention may include any of the features, options or possibilities set out elsewhere within this document, including from amongst the following.

The method of processing may be processing to separate one or more salts from one or more metals. For instance sodium chloride and/or sodium chlorate and/or potassium chloride and/or potassium chlorate may be separated, particularly from aluminium and/or ferrous metals.

The method of processing may be processing to separate one or more salts from one or more non-metals. For instance sodium chloride and/or sodium chlorate and/or potassium chloride and/or potassium chlorate may be separated, particularly from aluminium oxides and/or other insoluble non-metallic compounds.

The method may provide for the recycling of one or more metals, for instance aluminium. The method may provide for the recycling of one or more salts, for instance sodium chloride and/or potassium chloride.

The material may be a slag. The material may be the upper layer from a metal melting process. The material may be a layer involved in recycling aluminium. The material may contain one or more salts, for instance sodium chloride and/or sodium chlorate and/or potassium chloride and/or potassium chlorate. The material may contain one or metals, for instance aluminium, and/or metal oxides, for instance aluminium oxide. The material may contain 10-35% aluminium oxide, 25-60% sodium chloride, 10-35% potassium chloride, 2-10% metallic aluminium and impurities, with the combination totaling 100%, for instance 15-30% aluminium oxide, 30-55% sodium chloride, 15-30% potassium chloride, 5-7% metallic aluminium and impurities, with the combination totaling 100%. The impurities may include carbides, nitrides, sulphides and/or phosphides.

The method of providing a material on the surface of a molten metal in a furnace may include feeding the material onto the surface of the molten metal, preferably from above the molten metal. The material may be fed in batches. The material may be fed continuously.

The molten metal is preferably aluminium.

The furnace may be a rotary furnace or other furnace type.

The first location may be the location at which the furnace is provided and/or at which the material is stored after removal from the furnace and/or after being compressed.

The material may be a slag. The material may be a compressed slag produced by compressing a slag. The slag may be compressed in a slag press. The slag may be compressed to remove molten aluminium from the slag. The material may contain one or more salts, for instance sodium chloride and/or sodium chlorate and/or potassium chloride and/or potassium chlorate. The material may contain one or more metals, for instance aluminium, and/or metal oxides, for instance aluminium oxide, ideally at a lower level than in the slag.

The compressed slag may be of a lower temperature than the slag. The compressed slag may have a temperature of less than 500° C. after compression.

The compressed slag may be allowed to cool. Preferably the compressed slag is not allowed to cool below 100° C., preferably below 350° C., more preferably below 525° C. and yet more preferably below 760° C.

The compressed slag may be allowed to cool at the first location.

The second location may process less than 20,000 tonnes of material per year, potentially less than 15,000 tonnes and even less than 10,0000 tonnes of material per year.

The processing of the material removed from the furnace which is provided at a second location may include one or more of the steps subsequent to the removal of the material from the furnace and more preferably subsequent to the compression of the material, for instance to form the compressed slag.

The second location is 5 km or less from the first location, and preferably is less than 2 km from the first location, more preferably is less than 1 km from the first location and ideally is less than 500 m from the first location. The first location and the second location are preferably owned and/or operated by the same legal entity. The furnace is preferably fed with recycled aluminium.

The compressed slag preferably is not allowed to cool below 100° C., preferably below 350° C., more preferably below 525° C. and yet more preferably below 760° C. before one or more process step are conducted at the second location.

The method may include a size reduction step. The size reduction step may reduce one or more dimensions of the material and/or increase the number of discrete parts in which the material is present. The size reduction step may include a plurality of size reduction steps. The size reduction step may include a crushing step. The size reduction step may include a jaw crusher. The size reduction step may include a grinding step. The size reduction step may include a rolling step. The size reduction step may include one or more sizing steps, for instance to separate the material into one or more fractions according to size. The size reduction step may generate a flat bed of material, for instance to render or expose ferrous metal to separation. The size reduction step may generate a flat bed of material which can readily be suspended in an airstream, for instance for feeding to a cyclone.

The method may include a ferrous and non-ferrous metal separation step. The separation may be made by an eddy current separator. The method may include a metal and non-metal separation step. The separation may be made by an eddy current separator and/or vibrating table and/or compressed air separator. Aluminium extracted by one or both of these separations may be returned to the furnace.

The method may include a density based separation step. The density based separation step may use a cyclone, particularly an air based cyclone. The density based separation step may remove one or more gas generating components from the material feed to the leaching step. The density separation may separate aluminium and/or aluminium containing components from other components, particularly salt components.

The method may include feeding the material to a leaching step by introducing the material to a leaching tank. The leaching step may be provided with one or more other feeds, for instance water. The leaching step may be provided with hydrogen peroxide. The hydrogen peroxide may be used to increase oxides content and/or decrease or remove nitrides content and/or calcides content.

The method may include obtaining a leachate from the leaching step or steps.

The leaching step may be a multiple pass leaching process where multiple passes through one leaching tank are provided and/or a multiple stage leaching process where passage through a number of leaching tanks is provided.

The residence time in the leaching stage may be less than 10 mins, preferably less than 8 mins and ideally 5 mins or less. The residence time may be controlled to control the gas volume generated by the leaching step.

The method may include obtaining the leachate from the leaching step or steps by extracting the leachate from a leaching tank, preferably from the bottom thereof. The leaching step may be provided with one or more other outlet streams, for instance an off gas stream and/or non-dissolved solids stream.

The off gas stream may be further processed, for instance by being combusted, ideally with heat and/or power generated by the combustion being used in one or more of the method steps and ideally the drying step or spray drying step.

The non-dissolved solids and the dissolved solids may be fed to a solid liquid separator, such as a filter. All of the material exiting the leaching step, bar the off gases, may be fed to the solid liquid separator. The non-dissolved solids and the dissolved solids may be fed to a mixer, such as a ribbon mixer, prior to be fed to the solid liquid separator. All of the material exiting the leaching step, bar the off gases, may be fed to a mixer, such as a ribbon mixer, prior to being fed to the solid liquid separator. The mixer may provide that the non-dissolved solids are evenly distributed in the dissolve solids, potentially with additional water, prior to feeding to the solid liquid separator.

The solid liquid separator may be a filter, particularly a belt filter, most preferably a vacuum belt filter. The dissolved solids stream may be drawn through the bed as the bed and material moves along. Additional wash water may be added to the non-dissolved solids in the filter.

The filtered solids may be fed to a conveyer belt and/or storage location. The filtered solids material may be fed to a drying stage. The drying stage may be a rotary dryer. The filtered solids may be fed to the drying stage by a screw feeder. The dried solids may be fed from the dryer to a storage location.

The separated solids may form a by-product, ideally which has a market value. The separated liquids may be returned to the leaching step and/or may be fed to the spray drying step.

The method may include feeding the leachate to a drying step or spray drying step, for instance via one or more buffering or storage containers. The leachate may be pumped to the drying step or spray drying step, and particularly one or multiple nozzles therein.

Particularly in relation to spray drying, one or more gases, for instance air, may be pumped to the drying step, particularly the nozzle/nozzles therein. The nozzle may co-inject the gas and leachate. The nozzle may act as an atomiser of the fluid leachate The drying step may use and/or the dryer may be a falling film evaporator. The leachate may flow down over one or more surfaces provided in the dryer, for instance the surfaces of one or more tubes. The leachate may flow as a thin film on the surface. One or more or all of the surfaces may be heated. The whole or a part of one or more or all of the surfaces may be heated. Gases, for instance air, may pass over the leachate, preferably moving in a direction different to, for instance opposing, the direction of movement of the leachate.

The method may include feeding hot gas, preferably hot air, to the drying step or spray drying step. The hot gas may be provided in a parallel or counter flow direction to the introduction of the leachate.

The gases may be the hot gases from the off gas stream processing and/or may possess energy generated by the off gas stream processing, particularly in terms of their temperature.

One or more additional components, for instance water or steam, may be added to the draying step, for instance co-injected with the gases. One or more additional components may be added to control the pressure and/or temperature and/or chemical composition of the feed to the drying step. The hot gas may be generated by a heating step, for instance by electrical heating and/or heating exchanger system.

The atomised leachate is preferably dried by contact with the hot gas. The atomised leachate is preferably solidified by the hot gas.

The method may include obtaining a solid from the drying step or spray drying step, for instance by separating the solid and the gas in the drying step or spray drying step. The solid may be collected at the bottom of the drying step or spray drying step. The solid may be removed in batches or continuously. One or more subsequent separations of solids from gas may be provided for the gas outlet stream, for instance using bag filters and/or cyclone separators. The gas outlet stream, preferably after solids separation, may be used to agitate and/or heat in one or more of the method steps, particularly in the drying step or spray drying step.

The method may include obtaining the solid from the leachate by using the drying step or spray drying step.

The method may include compressing and/or moulding the solid into pellets in one or more further steps. The one or more further steps may include a pelletising step. The compressing and/or moulding may be provided without adding any further components to the solid. In particular no binders or moisture may be added.

The compressed and/or moulded solids, for instance pellets, may be collected and/or stored, for instance for subsequent use. The compressed and/or moulded solids, for instance pellets, may be fed to a furnace, ideally the furnace at the first location. The compressed and/or moulded solids, for instance pellets, may be fed to a furnace, ideally the furnace at the first location, to provide a material on the surface of a molten metal in a furnace.

The compressed and/or moulded solids, for instance pellets, may be produced to a controlled size.

The compressed and/or moulded solids, for instance pellets, may be produced to a controlled size distribution, for instance such that less than 5%, more preferably less than 2%, of the pelletised material by weight is less than 149 microns in diameter, for instance considered as the largest linear dimension.

The compressed and/or moulded solids, for instance pellets, may be produced to a controlled moisture level, for instance less that 0.5 wt % or preferably less than 0.2 wt %.

The compressed and/or moulded solids, for instance pellets, may be produced with a controlled ratio of sodium chloride to potassium chloride, for instance a predetermined ratio+/−5%. The ratio may be between 4:1 and 1:1 sodium chloride to potassium chloride.

One or more batches of compressed and/or moulded solids, for instance pellets, having a first set of characteristics may be blended with one or more other batches of compressed and/or moulded solids, for instance pellets, having one or more different characteristics.

Various embodiments of the invention will now be described, by way of example only, and with reference to the accompanying drawings in which.

There are various problems with the large scale centralised process. These include:

The transport costs in taking the compressed slag 9 to a suitable centralised plant for processing;

The significant regulatory issues (particularly if country borders are crossed) with such transportation;

The safety risk from accidents and the like involved in such transportation; Having to use a centralised process plant, outside of the salt producer's control;

The increased energy requirements and difficulty in achieving size reduction of the cold compressed slag;

The variable nature of the feed slag, due to its containing different salt levels, different slat proportions, different contaminants and the like as it arrives from various different aluminium recyclers, giving process control issues;

The variable nature of feed slag impacting upon the dry salt produced (in terms of its chemical make-up, moisture content and size distribution) meaning the product is not well controlled or defined and so impairs it as a good salt feed for the furnace.

Figure 1:
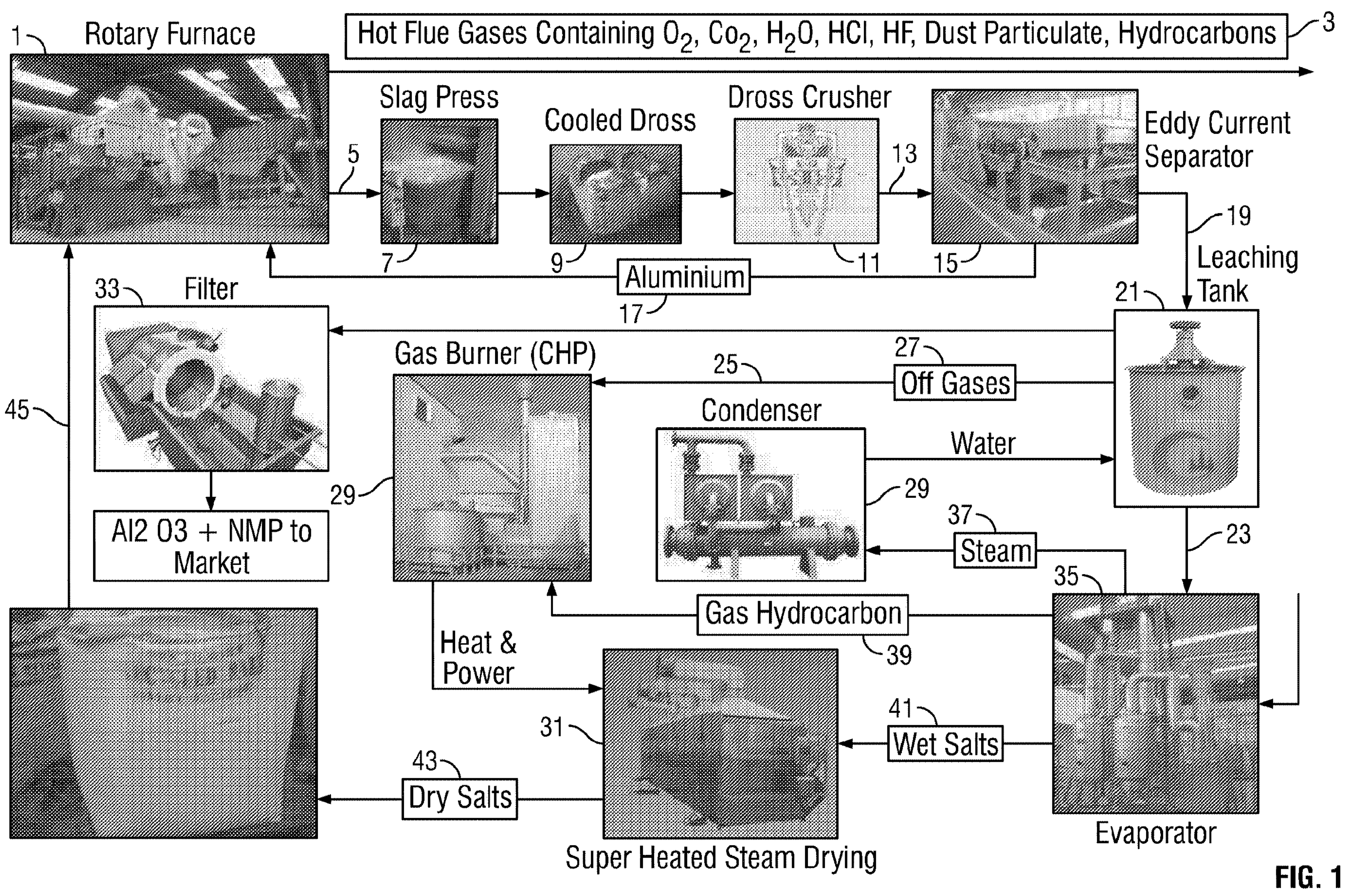
FIG. 1 is a flow diagram for a process for the recovery of salt from an aluminium recycling process, including improvements according to the invention.

In FIG. 1, a rotary furnace 1 is used to recycle aluminium, such as scrap which is contaminated with paint, lacquers and the like. The furnace 1 generates an aluminium product stream (not shown) together with an off gas stream 3 and a slag stream 5.

The off gas stream 3 is subjected to suitable processing to recover/use or render safe the gases it contains.

To prevent oxidisation of the aluminium and to provide other benefits, a salt is added to the top of the melt in the furnace 1 to form a barrier. The salt, together with some aluminium, forms the slag and hence the slag stream 5. The salt is mainly sodium chloride, but with potassium chloride too and other materials. A typical salt slag (also known as aluminium salt cake) produced by the secondary aluminium industry may contain 15-30% aluminium oxide, 30-55% sodium chloride, 15-30% potassium chloride, 5-7% other materials (such as aluminium and impurities including carbides, nitrides, sulphides and phosphides etc.

After processing, the aluminium is drained from the furnace 1 and the slag is the main material remaining. The slag is formed mainly of the salt, together with the removed contaminants and other components picked up in the melting process.

When the slag stream 5 is removed from the furnace 1 it is general emptied into bins (not shown) and then fed to a slag press 7 to allow for mechanically assisted agglomeration of the aluminium from the slag. The aluminium is generally returned to the furnace 1 after separation. The compressed material from the slag press 7 is classified as compressed slag 9.

The compressed slag 9 is allowed to cool. The compressed slag 9 still contains a material amount of aluminium and a large amount of salt. The compressed slag is classified as a hazardous material, with respect to environmental and other laws, in many countries and so requires further consideration.

One option is to transport the compressed slag 9 to a suitable plant for the recovery of the aluminium and treatment to recover the salt. This involves road transportation of the compressed slag 9 from the site of the furnace 1 where the compressed slag 9 is generated, to the distant processing plant. This involves significant transport costs, significant regulatory issues (particularly if country borders are crossed) and a safety risk from accidents and the like.

The typical process plants are large installations which provide centralised treatment of the compressed slag 9 arising from various aluminium melting plants.

The compressed slag 9 is cold by the time processing starts and is fed to a salt crusher 11 to reduce the compressed slag 9 in size. The cold nature of the compressed slag 9 presents difficulties and increased energy requirements for the size reduction steps. For instance, pneumatic breakers may be needed to initially break up the compressed slag 9 into smaller lumps. The size reduction may include the illustrated salt crusher 11, together with size based separation steps, such as sieves.

The size reduced salt stream 13 is then fed to an eddy current separator 15. This generates a ferrous stream (not shown) which is recycled, an aluminium stream 17 which may be collected and sold and/or may be returned to the furnace 1 and a cleaned salt stream 19.

The cleaned salt stream 19 is fed to a leaching tank 21, together with a water stream. The leaching process dissolves the salt content of the cleaned salt stream 19, ionises the sodium chlorate and so provides a dissolved salt stream 23. The remaining solids, generally aluminium oxides and non-metallic particles form suspended solid stream 25. The leaching off gas stream 27 is fed to a combined heat and power unit 29 where it is burnt to provide power and heat to the overall process, in particular to the steam dryer 31. Typical gases include hydrogen, methane, and ammonia. Phosphine and hydrogen sulphide may also be present.

The suspended solid stream 25 is fed to a filter 33 to separate the solids from the liquid. The solids are a useful by product of the process which can be sold. The liquids are returned (not shown) to the leaching tank 21.

The dissolved salt stream 23 is passed to an evaporator 35 to give rise to a steam stream 37, a gas hydrocarbon stream 39 (which also goes to the combined heat and power unit 29) and a wet salt stream 41.

The steam stream 37 is fed to a condenser 43 and the resulting condensed water stream is fed back to the leaching tank 21.

The wet salt stream 41 is taken to a super heated steam dryer 31. This produces a steam/water vapour stream (not shown) which is returned to the leaching tank 21 and the products stream, the dry salt stream 43. The dry salt stream 43 can provide salt feed 45 for the furnace 1.

The present invention attempts to address these issues and/or provide improvements in them as a result of the process approach and changes made.

Figure 2:
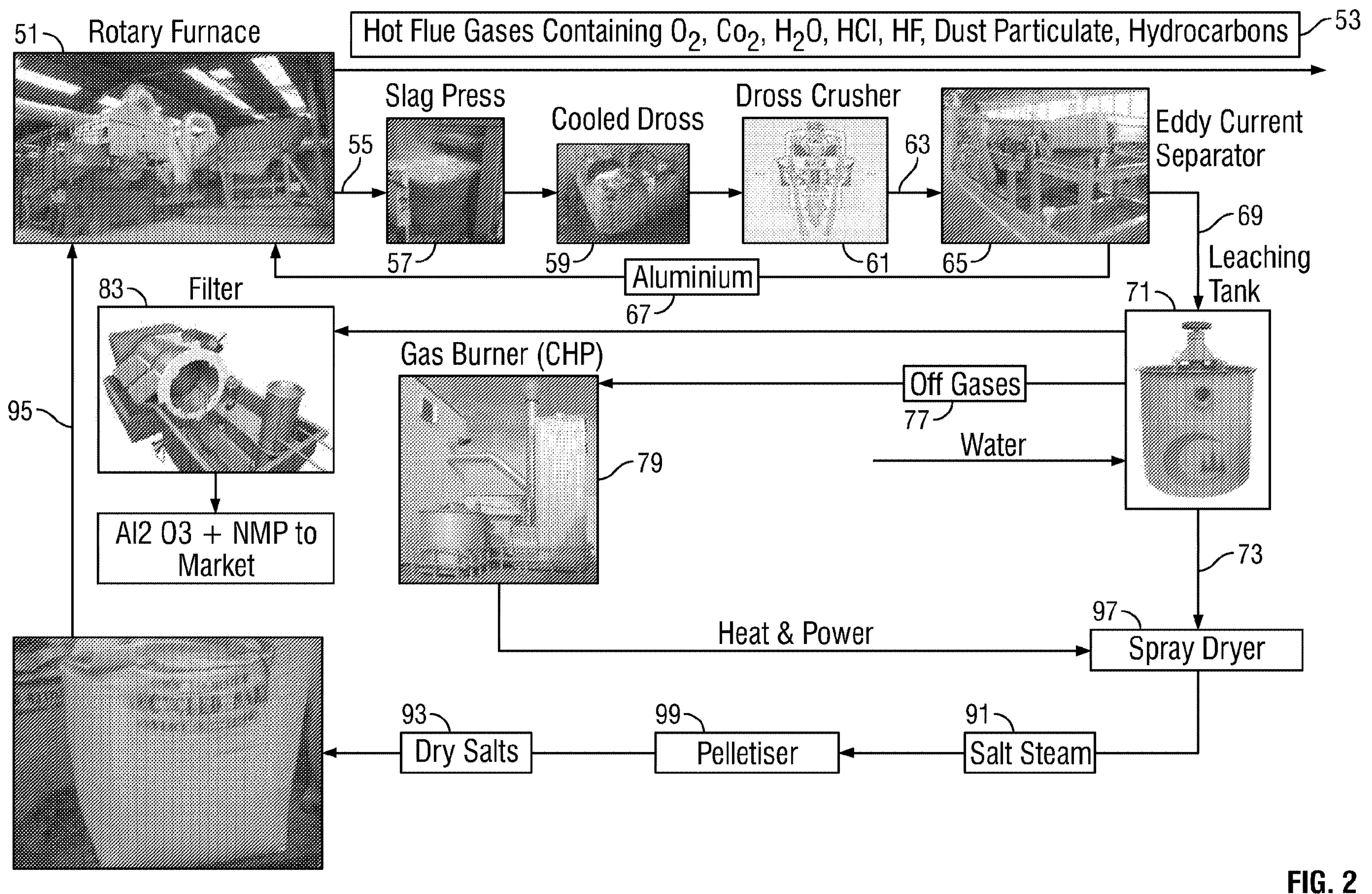
FIG. 2 is a flow diagram for a process according to an embodiment of the invention.

Referring to FIG. 2, the overall process of an embodiment of the invention is provided. Once again, the rotary furnace 51 is used to recycle aluminium and the furnace 51 generates an aluminium product stream (not shown) together with an off gas stream 53 and a slag stream 55.

Features in common with the approach of FIG. 1 are not repeated, but are still applicable to the FIG. 2 embodiment. For instance, the off gas stream 53 is subjected to suitable processing to recover/use or render safe the gases it contains.

The slag stream 55 is removed from the furnace 51 it is then fed to a slag press 57. The compressed material from the slag press 57 is again the compressed slag 59.

In this embodiment of the invention, the compressed slag 59 is processed at the same site as it is generated at. This is possible because of the lower capital cost and lower unit sizes viable for the overall process selected in this embodiment when compared with the prior approach. A typical localised plant might be configured to handle 1 tonne or less per hour of salt, whereas centralised plants may handle 5 or more tonnes per hour.

A first benefit arising from this is that the compressed slag 59 is only allowed to cool to the desired extent. That cooling still aids handling and reduces the risk of the hot aluminium reacting further, but the compressed slag 59 is not allowed to cool to an extent that would cause negative impacts in the subsequent size reduction stage.

The compressed slag 59 is fed to a slag crusher 61 to reduce the compressed slag 59 in size. However, as the compressed slag 59 is not cold and hard, the size reduction is easier to achieve and the size distribution resulting is more readily controlled. This gives a better size distribution and/or reduced amount of fine material, for instance sub 1 mm material. This is significant in improving the scaleability of the solids recovered from the suspended solids stream 75.

In the optimised format, the size reduction stage 61 provides a jaw crusher to affect the main reduction in size. However, the compressed slag 59 is then fed to a roller. The roller is used to generate a more consistent product in a flat format which is suitable for presentation to an eddy current separator 65. The roller also ensures that the compressed slag 59 is in a size range suited for processing in a subsequent cyclone separation.

After size reduction, the size reduced slag stream 63 is then fed to an eddy current separator 65. This generates a ferrous stream (not shown) which is recycled.

In the optimised format, the remaining material, including the salt, is fed from the eddy current separator 65 to an additional cyclone separator. The cyclone separator involves suspending the remaining material in air and then subjecting it to a gravity based separation due to the cyclone separator's action. The cyclone is effective in removing components which undesirably would otherwise be responsible for gas production in later stages. An aluminium stream 67 which is returned to the furnace 1 and a cleaned salt stream 69 is thus produced.

The cleaned salt stream 69 is fed to a leaching tank 71, together with a water stream 73. The same general leaching process is provided.

In the optimised format, however, the residence time in the leaching stage is material reduced and treatment chemicals are fed to the leaching stage too. A residence around 5 minutes is preferred. This is possible due to the controlled size distribution that is fed to the leaching tank. The reduced residence time and/or treatment chemicals are beneficial in greatly reducing the gas volume generated. The treatment chemicals may include hydrogen peroxide. Hydrogen peroxide is beneficial in maximising oxide forms and in reducing or removing nitride and calcide forms.

The known nature of the slag 59, because the aluminium recycling plant operator and the slag processing plant operator is the same, mean that the feed material to the leaching tank 71 is better known and more consistent.

The dissolved salt stream 73, the suspended solid stream 75 and the leaching off gas stream 77 arise as before. The leaching off gas stream 77, however, is now made use of to increase the energy efficiency of the overall system. The leaching off gas stream 77 is fed to a combined heat and power unit 79 where it is burnt to provide power and heat to the overall process. In particular, the power can be made of throughout the process to drive one or more processes and the heat can be made use of in the spray dryer 97. Typical gases present include hydrogen, methane, and ammonia. Phosphine and hydrogen sulphide may also be present.

In the optimised format, the dissolved salt stream 73 and the suspended solid stream 75 are drawn from the leaching tank 71 in a single process stream. The single stream is fed to a ribbon mixer. The ribbon mixer ensures that the suspended solids are evenly distributed in the dissolve salts, potentially with additional water, prior to feeding the filter 83.

The suspended solid and dissolved salt mixture is fed to a filter 83 to separate the solids from the liquid. The solids are a useful by product of the process which can be sold and with improved properties and hence value, as mentioned above.

In the optimised format, the filter 83 is a vacuum belt filter and the dissolved salt stream is drawn through the bed as the material moves along it, to leave the suspended solids behind. Additional wash water is added to clean the suspended solids separated from the dissolved salt stream on the filter, with the wash water being collected with the dissolved salt stream.

The dissolved salt stream 73 is then subjected to different processing steps than before, as described further below.

In the optimised format, the suspended solids stream 75 is subjected to improved processing. The solids stream is discharged from the vacuum belt filter on to a discharge conveyor belt and then into a storage hopper. From the storage hopper the solids are drawn by a screw feeder to a rotary dryer. The rotary dryer is used to dry the solids stream to the desired level. The dried solids are discharged to a storage location.

The dissolved salt stream 73 is passed to the spray dryer 97, described in more detail below. The spray dryer benefits from heat recycled from the furnace 51 and/or from the combined heat and power unit 59. The salt stream 91 arising is much drier than from the evaporator in the FIG. 1 form.

In an embodiment not shown, the dissolved salt stream 73 may be passed to an evaporator to give rise to a steam stream, a gas hydrocarbon stream (which also goes to the combined heat and power unit 79) and a wet salt stream 73 which then passes to the spray dryer 97 described above.

An issue with the salt stream 91 is that the particle size is relatively small. However, the applicant has identified that this issue can be address by feeding the salt stream 91 to a pelletiser 99, described in more detail below. Furthermore, the applicant has identified that the salt stream properties and size are ideally suited to pelletisation without the need for further treatment or additives, such as binders.

As the product stream, the dry salt stream 93 is now pelletized, this allows for the optimisation of the physical properties, such as the size of the pellets, for the subsequent reuse of the dry salt stream 93 as a salt feed 95 for the furnace 51.

In addition, the pellets are known to be of a standard content and so offer more controlled feeds to the furnace 51, for instance in terms of the ratio of sodium chloride to potassium chloride present (which is used to control the sodium chloride melting temperature). The blending of different pellets is also possible to provide other variation in the feed to the furnace 51.

Finally, the pellets are also more suited to storage, without moisture take up, for instance, than the dry salt product of the FIG. 1 form.

Figure 3:
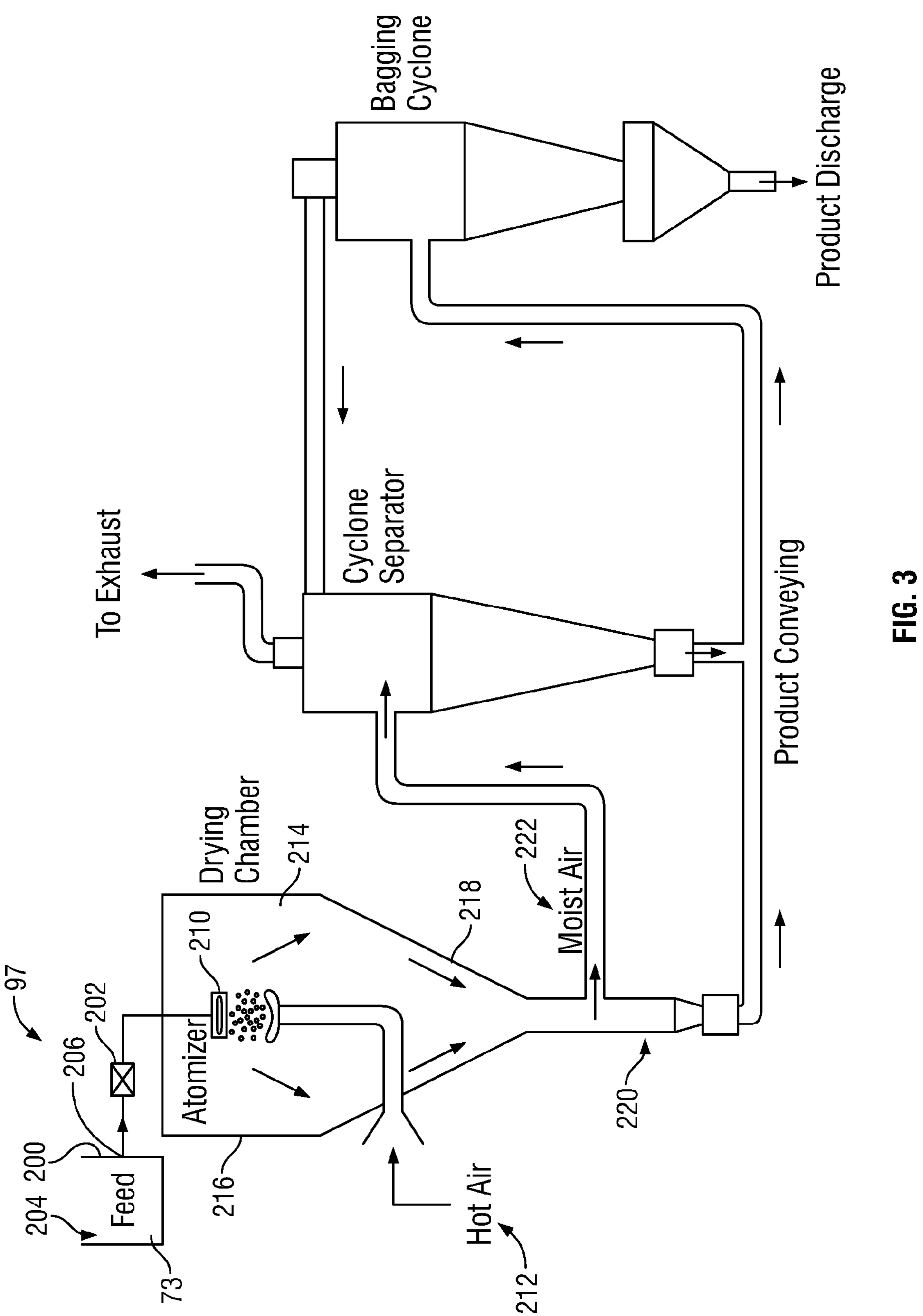
FIG. 3 is a schematic illustration of a spray dryer for use in the invention.

As illustrated in FIG. 3, the spray dryer 97 receives the dissolved salt stream 73 via a balance tank 200, with the flow into the tank controlled by a valve 202 to maintain the solution level. Low to open and high to close level probes are used to operate the valve 202. A water inlet 204 is also provided to the balance tank 200. The outlet 206 supplies the dissolved salt stream 73 to a peristaltic pump which pumps the dissolved salt stream 73 to the atomiser 210.

The atomiser 210 also receives filtered air.

The atomiser 210 makes use of a two fluid nozzle atomiser offering co-current mode, but rotary atomisers and two fluid atomisers in fountain mode are possible too. The high velocity air encounters the low velocity fluid to disintegrate that into droplets.

The atomiser 210 is positioned in the upper part of the drying chamber 214, with the drying chamber 214 being formed of a cylindrical upper part 216 and conical lower part 218. The bottom of the conical part 218 provides the powder outlet 220 and moist air side outlet 222.

The atomised fluid directly encounters the hot air which has passed through the heating stage 212. The heating stage 212 includes the electrical heat source and baffled air distributors to control the flow pattern and heat transfer in the air.

Upon entering the drying chamber 214 through the atomiser 210, the dissolved salt stream 73 comes into intimate contact with the hot air. This provides for the drying in the hot air stream. Away from the atomiser 210 the drying chamber 214 allows the separation of the dry powder from the hot air, with both passing to their respective outlets.

The dry powder is conveyed away by a fluidised ejector. Cooling and packing of the powder can then be provided for.

The separated hot air enters an air stream going to atmosphere which is provided with bag filters to remove any remaining powder, with cyclones offering an alternative form of filtering.

The following table defines some typical operating characteristics of a suitable spray dryer.

TABLE 1

| Characteristic | Value | Units |
| --- | --- | --- |
| Processed material | Chloride based salts | |
| Average residence time in dryer | 11 | s |
| Material feed rate | 100 | Kg/hr |
| Feed solids content | 30 | % |
| Rate of powder production | 30 | Kg/hr |
| Evaporation rate of dryer | 70 | Kg/hr |
| Residual moisture in product | 1 | % |
| Drying air inlet temperature | 190 | ° C. |
| Drying air outlet temperature | 97 | ° C. |
| Powder temperature | 85 | ° C. |
| Mass flow rate of drying air | 2454 | Kg/hr |
| Heat input to dryer | 103905 | Kcal/hr |
| Heat input to dryer | 120 | KW |
| Operational running load | 20 | HP |
| Electrical supply | 440-3-50 | VV-ph-Hz |
| Instrumentation | 24 | V |

The spray drying product has closely controlled particle size distribution, residual moisture content, bulk density and morphology In terms of the results achieved, the variation in moisture content achieved with varying conditions is detailed in Table 2.

TABLE 2

| Trial | Inlet Temp ° C. | Outlet Temp ° C. | Feed Rate L/hr | Salt Conc wt % | NaCl: KCl | Moisture wt % |
| --- | --- | --- | --- | --- | --- | --- |
| 1 | 150 | 90 | 1.2 | 24.2 | 66:34 | 0.27 |
| 2 | 195 | 102 | 2 | 24.2 | 66:34 | 1.05 |
| 3 | 150 | 90 | 1.2 | 24.6 | 50:50 | 0.31 |
| 4 | 195 | 100 | 2 | 24.6 | 50:50 | 1.64 |
| 5 | 150 | 90 | 1.2 | 16.7 | 66:34 | 0.32 |
| 6 | 196 | 102 | 2 | 16.7 | 66:34 | |
| 7 | 150 | 90 | 1.2 | 17.0 | 49:51 | 1.18 |
| 8 | 197 | 99 | 2 | 17.0 | 49:51 | 1.40 |

The particles generated, when measured using SEM imaging, are generally around 5 to 30 microns in diameter and are blocky crystals in appearance. Optical microscope imaging also confirmed that the particles tend to form agglomerates of 120 to 2500 microns in diameter.

The pelletiser 99 is important in increasing the size of the product to a size at which it is not prone to airborne transportation out of the furnace.

Roll based compactors were used to examine the suitability of the powder to pelletizing. The powder was fed using gravity through two counter rotating rollers. Friction between the material and the roller surfaces brought the powder into the narrow space between the rolls and the high loads present gave good compaction of the powder. The powder held together in the compacted form without the need for any binders, water or other additives to be present.

Roll based pelletisers, where the rolls bear opposing halves of the recessed spaces where the pellets form where then used to form pellets successfully.

The technique readily achieves moisture contents below 0.2 wt % and allows less than 2% of the material to be below 149 microns in diameter (so minimising the amount of fines present).

The invention claimed is:

1. A method of processing a material from a metal melting process, the material comprising one or more salts and one or more metals, the method including:

feeding the material to a size reduction step;

feeding the material from the size reduction step to a density based separation step;

forming a cleaned salt stream at the density based separation step; and feeding the cleaned salt stream from the density based separation step to a leaching step.

2. The method of claim 1, wherein the size reduction step includes a jaw crushing step, a rolling step, or both.

3. The method of claim 1, comprising feeding a treatment chemical to the leaching step, the treatment chemical being distinct from the cleaned salt stream.

4. The method of claim 1, wherein the size reduction step provides an output as a flat bed of material to expose a ferrous metal to separation.

5. The method of claim 1, comprising:

forming a leached salt stream, at the leaching step; and feeding the leached salt stream from the leaching step to a spray dryer.

6. The method of claim 1, wherein the size reduction step is followed by a ferrous metal separation step and then a non-ferrous metal separation step.

7. The method of claim 6, wherein a residence time of the leaching step is less than 10 minutes.

8. The method of claim 6, wherein aluminium extracted by the density based separation step is returned to a furnace.

9. The method of claim 1, wherein the density based separation step uses a cyclone or an air based cyclone.

10. The method of claim 1, comprising removing, at the density based separation step, one or more gas generating components from the material to form the cleaned salt stream.

11. The method of claim 1, wherein the density based separation step separates aluminium and/or aluminium containing components from salt containing components.

12. The method of claim 1, comprising producing, at the leaching step, a dissolved salt stream and a suspended solid stream; and feeding the dissolved salt stream and the suspended solid stream to a filter step.

13. The method of claim 12, wherein the filter step includes feeding the dissolved salt stream and the suspended solid stream to a vacuum belt filter.

14. The method of claim 12, feeding the dissolved salt stream from the filter step to a spray dryer.

* * * * *